United States Patent
Lemonnier et al.

(10) Patent No.: US 12,196,105 B2
(45) Date of Patent: Jan. 14, 2025

(54) COOLING JACKET OF A HOLLOW BLADE OF A DISTRIBUTOR

(71) Applicant: SAFRAN AIRCRAFT ENGINES, Paris (FR)

(72) Inventors: Jérôme Claude George Lemonnier, Moissy-Cramayel (FR); Franck Davy Boisnault, Moissy-Cramayel (FR); Antoine Bruno Van Noort, Moissy-Cramayel (FR); Kévin Claude Luc Baudy, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/293,661

(22) PCT Filed: Jul. 27, 2022

(86) PCT No.: PCT/FR2022/051510
§ 371 (c)(1),
(2) Date: Jan. 30, 2024

(87) PCT Pub. No.: WO2023/012421
PCT Pub. Date: Feb. 9, 2023

(65) Prior Publication Data
US 2024/0271535 A1    Aug. 15, 2024

(30) Foreign Application Priority Data
Aug. 5, 2021   (FR) ........................... 2108515

(51) Int. Cl.
*F01D 5/18*   (2006.01)
*B23H 9/10*   (2006.01)
(Continued)

(52) U.S. Cl.
CPC .............. *F01D 5/186* (2013.01); *B33Y 10/00* (2014.12); *B33Y 80/00* (2014.12); *F01D 5/189* (2013.01);
(Continued)

(58) Field of Classification Search
CPC .......... F01D 5/188; F01D 5/189; F01D 9/065; F05D 2260/201; F05D 2230/238;
(Continued)

(56) References Cited

U.S. PATENT DOCUMENTS

| 5,145,315 A | 9/1992 | North et al. |
| 6,354,797 B1 * | 3/2002 | Heyward .................. F01D 9/04 29/889.721 |

(Continued)

FOREIGN PATENT DOCUMENTS

| EP | 1 840 331 A1 | 10/2007 |
| FR | 2 976 616 A1 | 12/2012 |

(Continued)

OTHER PUBLICATIONS

English machine translation of FR 3066783A1, Jul. 23, 2024.*
(Continued)

*Primary Examiner* — Christopher Verdier
(74) *Attorney, Agent, or Firm* — Pillsbury Winthrop Shaw Pittman LLP

(57) ABSTRACT

A cooling jacket for a hollow airfoil of a turbine nozzle of a turbomachine, includes a main body including a central intake duct central defining a first ventilation air circulation area and connected to suction and pressure faces including at least two rows of drill holes by two separating walls defining second and third ventilation air circulation areas, an outer plate including first, second and third holes to allow the ventilation air respectively into the first, second and third ventilation air circulation areas, and an inner plate including (Continued)

a central opening to expel air from the first ventilation air circulation area, the outer and inner plates being secured by respectively soldering to the main body to form a one-piece unit with three ventilation air circulation areas, independent and airtight with respect to one another, before its installation in the hollow airfoil of the nozzle.

10 Claims, 3 Drawing Sheets

(51) Int. Cl.
    B23P 15/00     (2006.01)
    B23P 15/04     (2006.01)
    B33Y 10/00     (2015.01)
    B33Y 40/20     (2020.01)
    B33Y 80/00     (2015.01)
    F01D 9/06      (2006.01)

(52) U.S. Cl.
    CPC ............... *F01D 9/065* (2013.01); *B23H 9/10* (2013.01); *B23P 15/008* (2013.01); *B23P 15/04* (2013.01); *B23P 2700/06* (2013.01); *B33Y 40/20* (2020.01); *F05D 2230/12* (2013.01); *F05D 2230/13* (2013.01); *F05D 2230/20* (2013.01); *F05D 2230/234* (2013.01); *F05D 2230/238* (2013.01); *F05D 2230/31* (2013.01); *F05D 2230/60* (2013.01); *F05D 2260/201* (2013.01); *F05D 2260/202* (2013.01); *Y10T 29/49339* (2015.01); *Y10T 29/49341* (2015.01); *Y10T 29/49343* (2015.01)

(58) Field of Classification Search
    CPC ......... F05D 2230/237; F05D 2230/232; F05D 2230/31; F05D 2230/60; F05D 2230/13; F05D 2230/12; F05D 2230/20; F05D 2230/10; B23H 9/10; Y10T 29/49343; Y10T 29/49339; Y10T 29/49341; B23P 15/04; B23P 2700/06; B23P 15/008; B33Y 80/00; B33Y 10/00; B33Y 40/20
    See application file for complete search history.

(56) References Cited

U.S. PATENT DOCUMENTS

| 2013/0051980 | A1* | 2/2013 | Grohens | F01D 17/085 |
| | | | | 415/115 |
| 2019/0032496 | A1* | 1/2019 | Kester | F01D 5/18 |
| 2021/0033027 | A1* | 2/2021 | Kovach | F01D 5/189 |

FOREIGN PATENT DOCUMENTS

| FR | 3 066 783 | A1 | 11/2018 |
| WO | WO 2020/188212 | A1 | 9/2020 |

OTHER PUBLICATIONS

Written Opinion of the International Searching Authority as issued in International Patent Application No. PCT/FR2022/051510, dated Nov. 11, 2022.

International Search Report as issued in International Patent Application No. PCT/FR2022/051510, dated Nov. 11, 2022.

* cited by examiner

[Fig. 1]
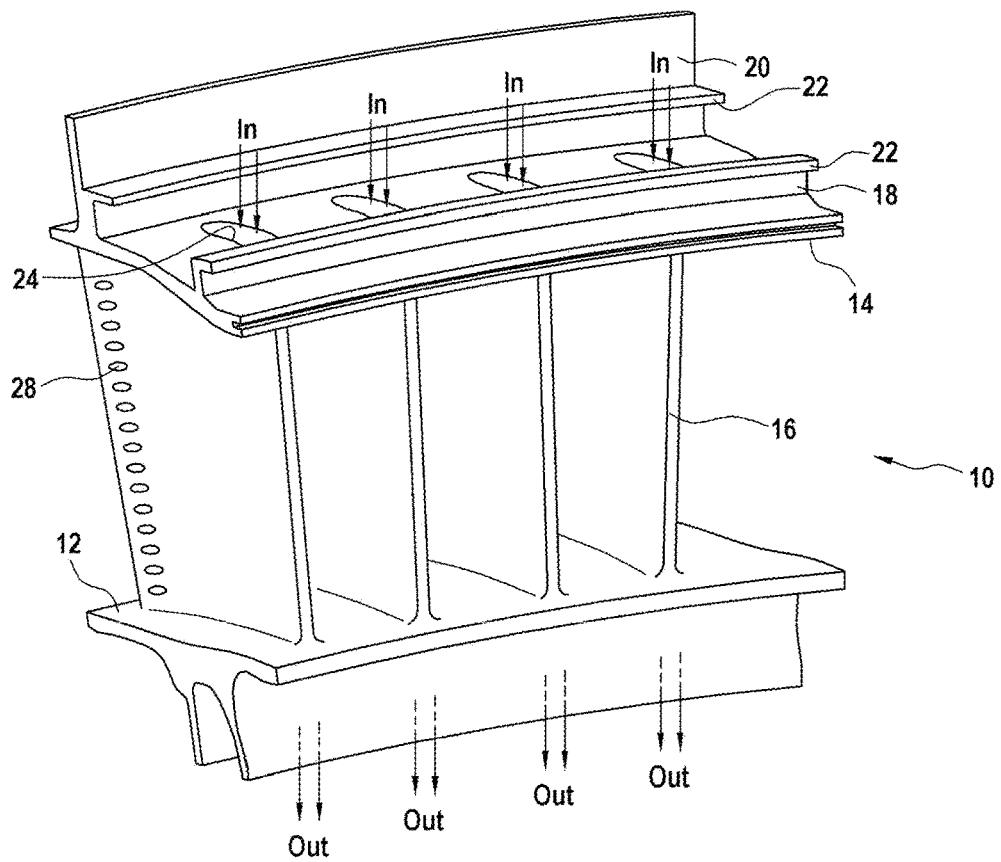
[Fig. 2]
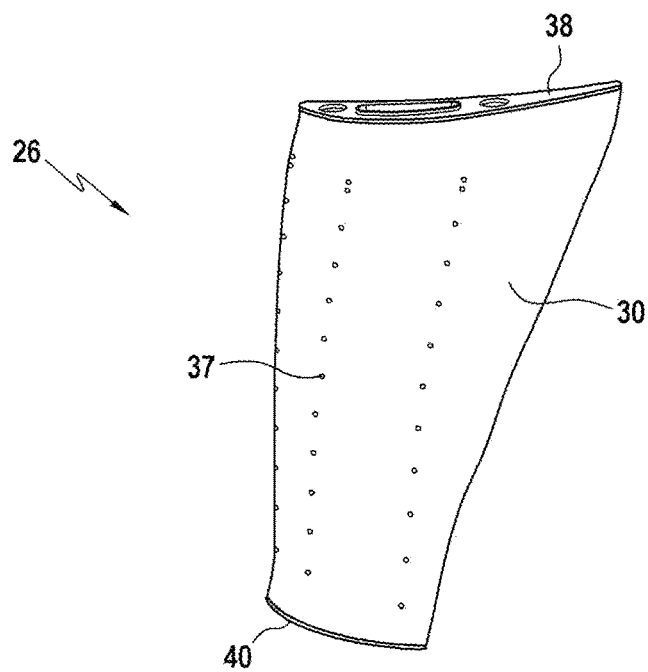

[Fig. 3]
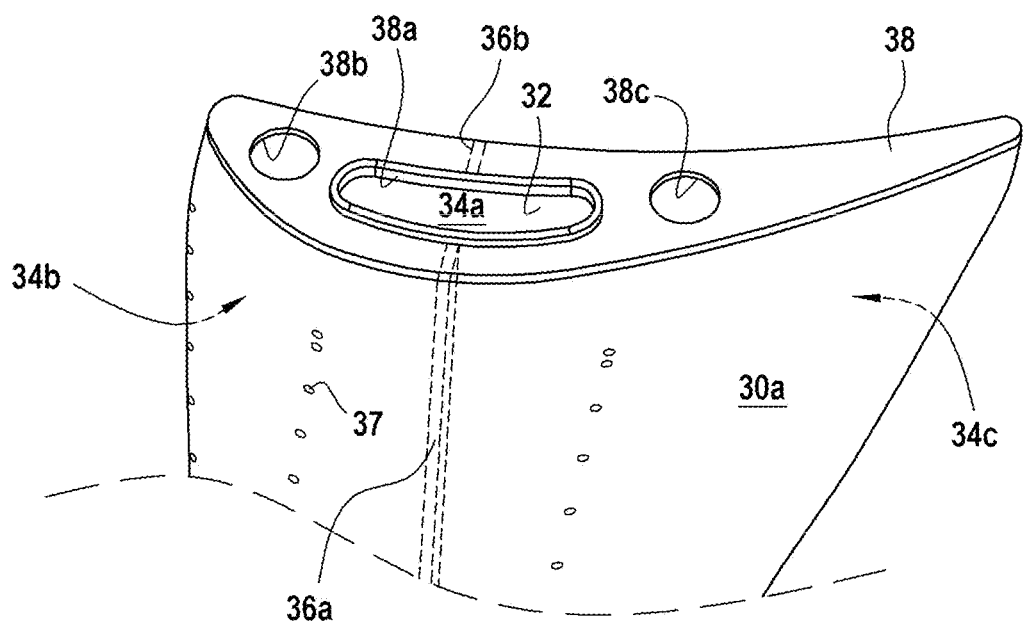
[Fig. 4]
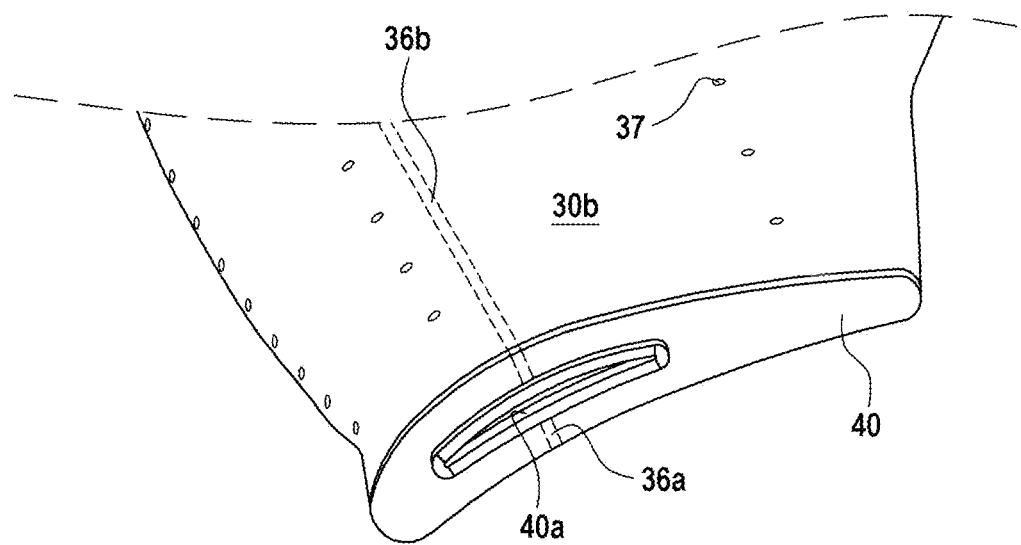

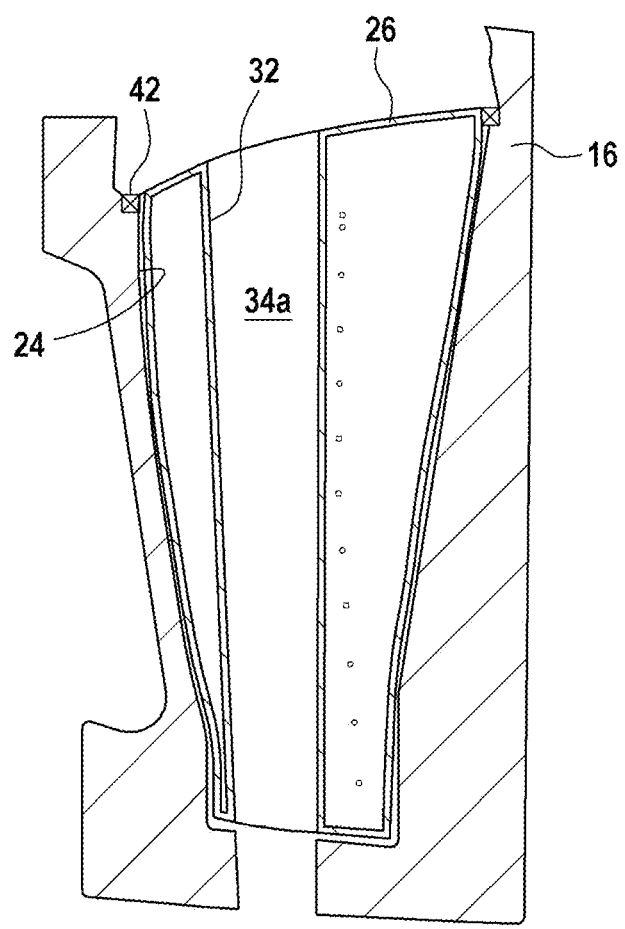
[Fig. 5]

COOLING JACKET OF A HOLLOW BLADE OF A DISTRIBUTOR

CROSS-REFERENCE TO RELATED APPLICATIONS

This application is the U.S. National Stage of PCT/FR2022/051510, filed Jul. 27, 2022, which in turn claims priority to French patent application number 21 08515 filed Aug. 5, 2021.

TECHNICAL FIELD

This invention relates to the general field of aeronautical turbomachines and in particular to aircraft turbomachines such as turbojet engines and turboprop engines, and it more specifically relates to the hollow airfoils of a nozzle of a gas turbine engine including a cooling jacket.

PRIOR ART

A turbine of a gas turbine engine conventionally includes one or more rows of movable turbine blades spaced circumferentially all around the rotor of the turbine. It also comprises a nozzle generally including a plurality of fixed or guide vanes which extend substantially radially between radially outer and radially inner coaxial annular platforms and which are spaced circumferentially with respect to one another. These fixed nozzle vanes, used to direct the stream of flow path gas toward the movable turbine blades located downstream of the nozzle at an appropriate angle and speed in order to rotationally drive the movable blades and the rotor of the turbine, are therefore directly in contact with the hot gas coming from the combustion chamber and are exposed to high temperatures. They therefore need to be cooled, and, to be able to ensure effective cooling of a fixed nozzle vane, it is desirable to have a cooling device which is thermally efficient to allow the dissipation of a high thermal power via the use of a moderate air flow rate.

In addition, it is desirable for this cooling device to be airtight to ensure that the air set in motion is solely dedicated to the cooling of the vane. Specifically, the greater the airtightness of the cooling device, the greater its overall efficiency, the latter being an increasing function of the airtightness and of the thermal efficiency of the cooling device.

It is known, for example from the application FR2976616 filed in the name of the applicant, to resort to a ventilation system comprising a tubular jacket made of multi-perforated sheet metal to cool the hollow airfoil of a nozzle by impacts of cooling air traversing the holes fashioned in the walls of the jacket. This air drawn upstream then flows downstream where it is expelled through the gas flow path via perforations provided along the wall of the trailing edge of the airfoil. It should be noted that the inner face of the airfoil wall can where applicable be provided with flow disrupting elements which promote thermal exchanges between the air circulating between the jacket and the wall of the airfoil.

On installation, the jacket, which has been previously shaped and provided with an air intake tube and a closing plate to form a one-piece unit, is slid into the inner cavity of the hollow airfoil of the nozzle through the opening fashioned in the radially outer annular platform. The jacket is then secured to the airfoil by welding or soldering along its edge in contact with the wall of the opening fashioned in this radially outer annular platform. The opposite part of the jacket is simply guided through the opening fashioned in the radially inner annular platform of the airfoil which forms a sliding mechanism to allow for relative movements between the airfoil and the jacket. These longitudinal displacements are due to temperature variations during the operation of the turbomachine and the fact that the two parts differ in the nature of their constituent materials and their method of manufacturing.

This solution, while giving overall satisfaction, grants little importance to the correct supply of air to the holes of the jacket located near the leading edge of the nozzle airfoils and to the robustness of the supply of air to the inter-disc cavities of the turbine. Specifically, the inside of the jacket is constituted only of a single cavity supplying all the holes of the jacket. In such a device, the air preferentially goes toward the circuits and/or holes where the pressure is the lowest. Thus, as soon as the air enters the jacket via the air intake tube, the air will go primarily toward the holes of the jacket located as near as possible to the perforations provided along the wall of the trailing edge of the airfoil of the nozzle, hence decreasing the supply to the perforations located in proximity to the leading edge of the nozzle and the inter-disc cavities, causing a loss of robustness as regards airtightness and cooling of these same cavities.

SUMMARY OF THE INVENTION

This invention thus has the main aim of palliating such drawbacks by making provision for a cooling jacket intended to be installed in a hollow airfoil of a nozzle of a turbomachine which allows a better distribution of the ventilation air flow allowed taken into the jacket. One aim is thus to supply a part of this ventilation air flow to other members of the turbomachine, particularly to the inter-disc cavities of a turbine, in order to render them airtight and to cool the turbine discs. Yet another aim is to make provision for a method for assembling a turbine nozzle which is economically advantageous with as low a production cost as possible.

These aims are achieved by a cooling jacket for a hollow airfoil of a turbine nozzle of a turbomachine, including:
  a main body extending along a radial direction between a radially inner end and a radially outer end and including suction and pressure faces and a central intake duct defining a first ventilation air circulation area and connected to these two faces by two separating walls defining second and third ventilation air circulation areas, each of the suction and pressure faces including at least two rows of drill holes to expel the ventilation air from the second and third ventilation air circulation areas,
  an outer plate disposed at the radially outer end of the main body, the outer plate including first, second and third holes to allow the ventilation air respectively into the first, second and third ventilation air circulation areas, and
  an inner plate disposed at the radially inner end of the main body, the inner plate including a central opening to expel air from the first ventilation air circulation area, the outer and inner plates being secured by soldering to the main body to form a one-piece unit with three ventilation air circulation areas, independent and airtight with respect to one another, before its installation in the hollow airfoil of the turbine nozzle.

Preferably, the main body and the outer and inner plates are made using additive manufacturing and the drill holes are made using electrical discharge machining or by laser.

Advantageously, the first hole includes a section which, in proportion to the number of airfoils, is greater than the sum of the sections of the injectors ensuring the ventilation air flow rates downstream, and the second and third ventilation air intake holes each include a section which is less than the sum of the sections of the drill holes respectively ensuring the expulsion of the ventilation air from the second and third ventilation air circulation areas.

This invention also relates to a turbine nozzle of a turbomachine including two coaxial annular platforms between which substantially radial hollow airfoils extend, each including a cooling jacket as mentioned above.

This invention further relates to an aeronautical turbomachine, such as a turbojet engine or a turboprop engine of an airplane, including a turbine nozzle as mentioned above.

Finally, this invention relates to a method for assembling a cooling jacket of a hollow airfoil of a turbine nozzle of a turbomachine, characterized in that it consists in: making a main body extending along a radial axis between a radially outer end and a radially inner end and including suction and pressure faces and a central intake duct defining a first ventilation air circulation area and connected to these two faces by two separating walls defining second and third ventilation air circulation areas; making an outer plate including first, second and third holes for taking in ventilation air respectively in the first, second and third ventilation air circulation areas; making an inner plate including a central opening for expelling the ventilation air from the first ventilation air circulation area; machining at least two rows of drill holes on each of the suction and pressure faces of the main body to expel the ventilation air from the second and third ventilation air circulation areas; and securing by soldering the outer and inner plates to the main body to form a one-piece unit with three ventilation air circulation areas, independent and airtight with respect to one another, before its installation in the hollow airfoil of the turbine nozzle.

Preferably, the suction and pressure faces constituting the outer shape of the main body are configured to fit an inner cavity of the hollow airfoil of the nozzle.

Advantageously, the contact surfaces between the main body and each of the outer and inner plates and the outer and inner surfaces of the main body are moreover polished before they are secured to said one-piece unit.

Preferably, the metallic material has a thickness of at least 0.5 mm.

BRIEF DESCRIPTION OF THE DRAWINGS

Other features and advantages of this invention will become apparent from the description given below, with reference to the appended drawings which illustrate an exemplary embodiment thereof devoid of any limiting features and wherein:

FIG. 1 is a schematic perspective view of a turbine nozzle segment intended to receive in each of its hollow airfoils a cooling jacket according to the invention, FIG. 2 is an outer perspective view of a cooling jacket according to the invention intended to be installed in each of the hollow airfoils of the turbine nozzle of FIG. 1, FIG. 3 details the upper and inner parts of the jacket of FIG. 1, FIG. 4 details the lower and inner parts of the jacket of FIG. 1, and FIG. 5 is a section view of the cooling jacket installed in the inner cavity of the hollow airfoil of the turbine nozzle of FIG. 1.

DESCRIPTION OF THE EMBODIMENTS

FIG. 1 shows a segment 10 of a turbine nozzle of a turbomachine, such as a turbojet engine or turboprop engine of an airplane, comprising two coaxial annular platforms, inner 12 and outer 14 respectively, which together delimit an annular gas flow path and between which substantially radial hollow airfoils 16 extend (the number of airfoils being able to be in the order of several tens). The outer platform 14 comprises upstream 18 and downstream 20 radially outer annular rims including axial annular tongues 22 oriented upstream and intended to be engaged in the corresponding axial annular grooves (not shown) of a turbine casing. The terms "outer" and "inner" should be understood in relation to the separation along the radial direction of the concerned elements from the longitudinal axis of the turbomachine around which the turbine nozzle extends.

The hollow airfoils of the turbine nozzle comprise inner cavities 24 in which a cooling jacket 26 (visible in FIG. 2) is installed, intended to ensure the circulation of ventilation air (see the In and Out arrows, of incoming and outgoing air respectively) coming from a supply chamber (not shown) radially outward of the outer platform 14, both in the hollow airfoil 16 (the air going back out via the slots 28 of the trailing edge) and toward a supply chamber (not shown) radially inward of the inner platform 12 and intended to supply the inter-disc cavities of the turbine with air.

In accordance with the invention and as illustrated in outside perspective in FIGS. 2 to 4, the cooling jacket 26 comprises the following elements:

a hollow main body 30 extending along the radial direction between a radially outer end and a radially inner end and including a suction face 30*a* and a pressure face 30*b*, of which the outer shape formed by these two faces substantially fits the inner cavity 24 of the airfoil 16 of the nozzle and which is secured to a central intake duct 32 defining a first ventilation air circulation area 34*a*, by way of two thick separation walls 36*a*, 36*b* disposed on either side of this central intake duct, between the central intake duct and each of the two faces 30*a*, 30*b* of the main body, in such a way as to define on either side of these walls, advantageously aligned, two separate upstream and downstream cavities, respectively defining second and third ventilation air circulation areas 34*b*, 34*c*, watertight with respect to one another and to the first ventilation air circulation area 34*a* and able to be supplied with ventilation air independently of one another, the suction and pressure faces of the main body each including several rows of drill holes 37 (typically at least two, one per cavity) in order to allow cooling by impact of the inner wall of the nozzle airfoil 16, an outer plate (first plate 38) intended to be secured to the radially outer end of the main body and on which are drilled both a first hole 38*a* supplying ventilation air to the central intake duct 32 enclosing the first ventilation air circulation area 34*a*, a second hole 38*b* supplying ventilation air to the second ventilation air circulation area 34*b* and a third hole 38*c* supplying ventilation air to the third ventilation air circulation area 34*c*, and an inner plate (second plate 40) intended to be secured to the radially outer end of the main body and on which is drilled a single central opening 40*a* in order to allow the ventilation air circulating in the central intake duct 32 to be directly guided to the inter-disc cavities of the turbine.

The cooling jacket is advantageously entirely made by additive manufacturing according to the metallic 3D printing process which takes place in the following phases.

Firstly, in a first phase, on one and the same plate of an additive manufacturing machine (or 3D printer) without recourse to any specific print medium, the main body 30 (including its central intake duct 32 and the separating walls 36a, 36b), the upper plate 38 and the inner plate 40 are printed, preferably separately (to facilitate the subsequent polishing step). To avoid obtaining surfaces deformed by the roller of the 3D printer, a minimum material thickness of 0.5 mm is moreover advised. The printing of the main body is done vertically starting, according to choice, with its lower part (the bottom of the body) or its upper part (the top of the body). The material used is a metallic material, typically chosen from among metallic alloys of Inconel® type.

Next, once the printing is finished, one continues to a second phase of machining, preferably of EDM (or Electrical Discharge Machining) type, of the different drill holes 37 of each suction and pressure face of the main body. However, laser drilling may also be envisioned.

In a third phase, an operation of polishing of the functional surfaces of the different elements (contact surfaces between the main body and the outer and inner plates of the jacket) is preferably carried out.

Finally, in a last phase, an operation of soldering of the outer and inner plates onto the main body makes it possible to finalize the jacket as a one-piece unit with three ventilation air circulation areas, independent and airtight with respect to one another, before its installation in the cavity 24 of the airfoil 16 of the nozzle as shown in the section of FIG. 5.

The cooling jacket obtained in this way by additive manufacturing is then, as known, secured and made watertight with respect to the inner wall of the nozzle by welding or soldering at the level of its outer plate 38 (see the weld bead 42), the inner plate 40 of the jacket itself being simply guided into the lower part of the nozzle which forms a slider to allow for relative movements between the airfoil 16 and the cooling jacket 26.

Thus installed and attached in the cavity 24, the cooling jacket 26 makes it possible to fulfil the following functions:
 impact cooling of the upstream part (near the leading edge) of the inner wall of the airfoil of the nozzle, the ventilation air entering through the second hole 38b to supply the upstream cavity 34b, then being expelled through a first row of drill holes 37 to then impact the inner wall of the airfoil of the nozzle. The air will then circulate in the space delimited by the inner wall of the airfoil of the nozzle and the outer wall of the jacket to then be expelled through the exit holes located on the trailing edge of the airfoil of the nozzle.
 impact cooling of the downstream part (near the trailing edge) of the inner wall of the airfoil of the nozzle, the ventilation air entering through the third hole 38c to supply the downstream cavity 34c, then being expelled through another row of drill holes 37 to then impact of the inner wall of the airfoil of the nozzle. The air will then circulate in the space delimited by the inner wall of the airfoil of the nozzle and the outer wall of the jacket to then be expelled through the same exit holes located on the trailing edge of the airfoil of the nozzle.
 supply of ventilation air to the inter-disc cavities, the air entering through the first hole 38a, circulating in the central intake duct 32 and being expelled through the central opening 40a of the inner plate 40.

Note that the second 38b and third 38c ventilation air intake holes can be of free shape (rectangular, circular, ovoid etc.) but must have sections allow the control of the respective flow rates of the upstream 34b and downstream 34c cavities. In other words, the section of these holes must be less than the sum of the sections of the drill holes composing the respective cavity. Contrariwise, the first hole 38a (as well as the central opening 40a which can have one and the same dimension or a smaller dimension), which can also be of free shape, must not have a section controlling the downstream flow rates, (this role specifically devolves to the injectors located in the inter-disc cavities), i.e. the sum of all the sections of the first holes 38a of the nozzle must be greater than the sum of the sections of the injectors ensuring the downstream ventilation air flow rates (the computation of the flow rate for a hole must therefore be in proportion to the number of airfoils of the nozzle).

The main advantages of the invention resulting from the aforementioned structure are hence as follows:
 The supply of ventilation air to the upstream drill holes is done separately from the drill holes located downstream of the jacket.
 The supply of ventilation air to the inter-disc cavities is done separately from the supply to the drill holes and without any heating during the passage through the central intake duct of the jacket.
 The manufacturing cost of the part is reduced.

The invention claimed is:

1. A cooling jacket for a hollow airfoil of a turbine nozzle of a turbomachine, comprising:
 a main body extending along a radial direction between a radially outer end and a radially inner end and including suction and pressure faces and a central intake duct defining a first ventilation air circulation area and connected to these two faces by two separating walls defining second and third ventilation air circulation areas, each of the suction and pressure faces including at least two rows of drill holes, one row of the at least two rows of drill holes expelling the ventilation air from the second ventilation area, and another row of the at least two rows of drill holes expelling the ventilation air from the third ventilation area,
 an outer plate disposed at the radially outer end of the main body, the outer plate including first, second and third holes to allow the ventilation air respectively into the first, second and third ventilation air circulation areas, and
 an inner plate disposed at the radially inner end of the main body, the inner plate including a central opening to expel air from the first ventilation air circulation area, the inner and outer plates being secured by soldering to the main body to form a one-piece unit with said first, second and third ventilation air circulation areas, independent and airtight with respect to one another.

2. The cooling jacket as claimed in claim 1, wherein the main body and the outer and inner plates are made using additive manufacturing and the drill holes are made using electrical discharge machining or by a laser.

3. The cooling jacket as claimed in claim 1, wherein the first hole includes a section which, in proportion to the number of airfoils, is greater than a sum of sections of injectors ensuring the ventilation air flow rates.

4. The cooling jacket as claimed in claim 1, wherein the second and third ventilation air intake holes each include a section which is less than a sum of the sections of the drill holes respectively ensuring the expulsion of the ventilation air from the second and third ventilation air circulation areas.

5. A turbine nozzle of a turbomachine including two coaxial annular platforms between which radial hollow airfoils extend, each including a cooling jacket as claimed in claim 1.

6. An aeronautical turbomachine, including at least one turbine nozzle as claimed in claim 5.

7. A method for assembling a cooling jacket of a hollow airfoil of a turbine nozzle of a turbomachine, the method comprising:

making a main body extending along a radial direction between a radially outer end and a radially inner end and including suction and pressure faces and a central intake duct defining a first ventilation air circulation area and connected to these two faces by two separating walls defining second and third ventilation air circulation areas;

making an outer plate including first, second and third holes for taking in ventilation air respectively in the first, second and third ventilation air circulation areas;

making an inner plate including a central opening for expelling the ventilation air from the first ventilation air circulation area; machining at least two rows of drill holes on each of the suction and pressure faces of the main body, one row of the at least two rows of drill holes expelling the ventilation air from the second ventilation area, and another row of the at least two rows of drill holes expelling the ventilation air from the third ventilation area; and securing by soldering the outer and inner plates to the main body to form a one-piece unit with said first, second and third ventilation air circulation areas, independent and airtight with respect to one another, before installation of said one-piece unit in the hollow airfoil of the turbine nozzle.

8. The assembling method as claimed in claim 7, wherein the suction and pressure faces constituting the outer shape of the main body are configured to fit an inner cavity of the hollow airfoil of the nozzle.

9. The assembling method as claimed in claim 7, wherein the contact surfaces between the main body and each of the outer and inner plates and the outer and inner surfaces of the main body are moreover polished before they are secured to said one-piece unit.

10. The assembling method as claimed in claim 7, wherein the main body and the outer and inner plates are printed on a metallic material having a thickness of at least 0.5 mm.

* * * * *